INVENTOR
Joseph Slepian.

Nov. 25, 1952      J. SLEPIAN      2,619,627
ELECTRIC CONVERTING DEVICE

Filed Jan. 28, 1949      2 SHEETS—SHEET 2

WITNESSES:
Robert A. Baird
Nw. G. Groome

INVENTOR
Joseph Slepian.
BY
Hymen Diamond
ATTORNEY

Patented Nov. 25, 1952

2,619,627

UNITED STATES PATENT OFFICE 2,619,627

ELECTRIC CONVERTING DEVICE

Joseph Slepian, Pittsburgh, Pa., assignor to Westinghouse Electric Corporation, East Pittsburgh, Pa., a corporation of Pennsylvania Application January 28, 1949, Serial No. 73,294

18 Claims. (Cl. 321—45)

My invention relates to apparatus modifying the properties of electric power, and it has particular relation to apparatus for converting alternating current power to direct current and direct current power to alternating current.

In the practice of my invention, the so-called Hall or Corbino effect is applied. These effects are manifested when an electric current and a magnetic field, the directions of which are not collinear or opposite, are impressed at a point in a conductor, semi-conductor, gas, electrolyte or other substance by the appearance generally of an electric field having a component in a direction at right angles to the plane of the current and magnetic field vectors. Vectorially the relationship between the total electric field, the current and the magnetic field may be expressed by the equation $$E = ki + A(H \times i)$$

in which E is the total electric field, $k$ the resistivity of the conductor, $i$ the current density, A a constant characteristic of the conductor which may be called the Hall effect constant, and H the magnetic field. The $A(H \times i)$ term of this equation is the right-angle electric field component mentioned above. The magnitude of A is dependent on the conductor which is utilized. The Hall and Corbino effects are manifested most strongly in such elements as silicon, antimony, bismuth, germanium (see "Review of Scientific Instruments," volume 19, Number 4, April 1948, page 263), and tellurium and alloys of these elements. When I refer, hereinafter to "a conductor of the silicon type," I mean not only a silicon conductor but a conductor of the other elements such as antimony, bismuth or germanium.

Converters in which the Hall and Corbino effects are applied are disclosed in Patents 1,778,796; 1,822,129; and 1,825,855, to Palmer H. Craig. A typical Craig system is shown in Fig. 4 of his Patent 1,778,796. In the apparatus shown in this view, alternating current is supplied to input conducting plates 1, 2, and 3 through wires connecting directly to the conductors. The input alternating current also flows through a coil which impresses a magnetic field on the plates 1, 2 and 3. This field is at right angles to the alternating current. Direct current is derived from the resulting Hall effect field through output wires connected to the plates at points displaced by 90° with reference to the points at which the input alternating current conductors are connected. The electric current and the magnetic field being derived from the same source reverse polarity simultaneously, and the current derived at the output conductors is always of the same polarity.

The Craig structure is inherently of low efficiency. This disadvantage arises from the fact that the plates 1, 2 and 3 are connected together to common conductors which are in turn connected to the terminals of the input A. C. source. These common conductors constitute shunt paths for the direct current which the apparatus is to supply.

It is accordingly an object of my invention to provide an efficient Hall or Corbino effect converter.

Another object of my invention is to provide a converter, the operation of which depends on the Hall or Corbino effect which shall deliver the maximum converted current practicable.

An ancillary object of my invention is to provide a Hall or Corbino effect converter in which the magnetizing effect of the output current shall not affect the operation deleteriously.

My invention arises from the realization that the input electric current component of a Hall effect system may be produced inductively and when so induced, does not materially deteriorate the efficiency of the system. In accordance with my invention, I provide a Hall effect converter in which the input electric current and the magnetic field are derived from a coil system disposed adjacent to the Hall effect conductor. When current flows in the coil system, a magnetic field is impressed on the conductor substantially at right angles to the electric current induced in the conductor and the Hall effect field component is produced. The operation of such a system can be analyzed by considering the relationships which arise when two adjacent conductors mutually produce Hall effect field components.

Let $E_1$ be the total electric field in one conductor, $E_2$ the total electric field in the other conductor, $i_1$ the current in one conductor and $i_2$ the current in the other conductor. Let H be the magnetic field and let us assume that A, the Hall effect constant, is the same for both conductors. Let $k$ be the resistivity of both conductors. Then $$E_1 = ki_1 + AHi_2$$
$$E_2 = ki_2 - AHi_1$$

The power consumed in one circuit is then $$E_1 i_1 = ki_1^2 - AHi_1 i_2$$

The power consumed in the second circuit is $$E_1 i_2 = ki_1^2 - AHi_1 i_2$$

The power dissipated in ohmic loss in both circuits is $$J = k i_1^2 + k i_2^2$$

The power transferred from the first circuit to the second is given by $$W = A H i_1 i_2$$

The loss factor at any instant is the ohmic loss divided by the power transferred and is given by $$L = \frac{k}{AH} \times \frac{i_1^2 + i_2^2}{i_1 i_2}$$

The instantaneous efficiency is given by $$S = \frac{A H i_1 i_2 - k i_2^2}{A H i_1 i_2 + k i_2^2}$$

Calculations which I have conducted on the basis of the above equations assuming that $k$ is of the order $6 \times 10^{-6}$,
$A$ of the order of $4 \times 10^{-9}$, and
$H$ of the order of $1 \times 10^{-4}$ and that $E_1$ and $i_1$ are sinusoidal, indicate that a maximum efficiency of 67% is attainable. With $H$ equal to $1.4 \times 10^{-4}$ maximum efficiency attainable is approximately 75%.

The novel features that I consider characteristic of my invention are set forth with particularity in the appended claims. My invention itself, however, both as to its organizartion and its method of operation together with additional objects and advantages thereof will be understood from the following description of specific embodiments when read in connection with the accompanying drawings, in which:

Figure 1:
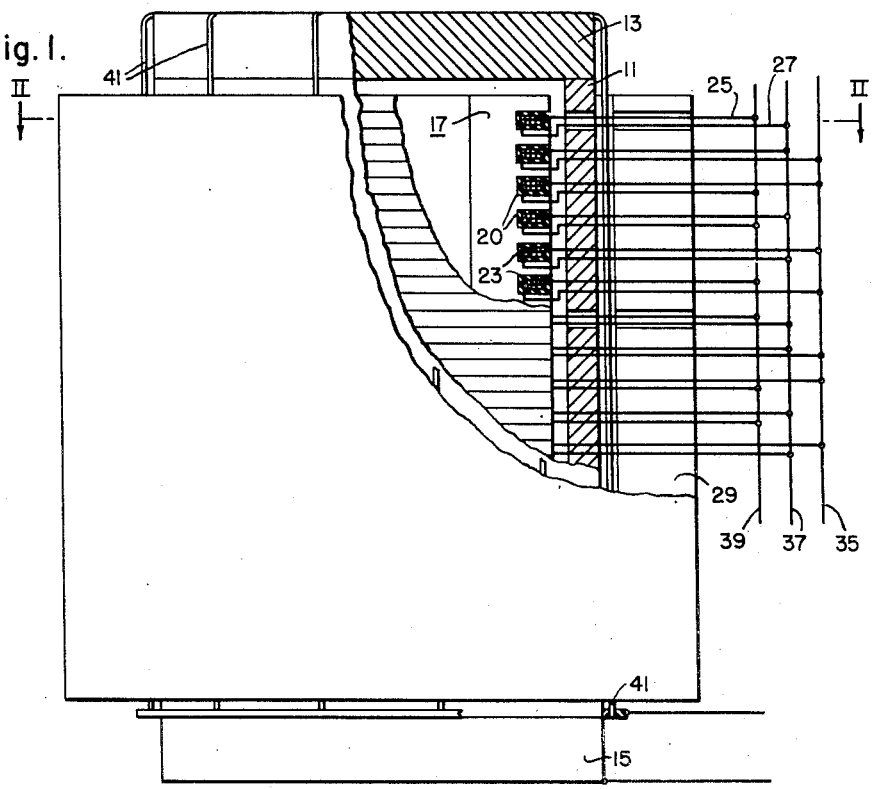
Figure 1 is a view partly in side elevation, partly in section and partly diagrammatic of a converter in accordance with my invention.
Figure 2:
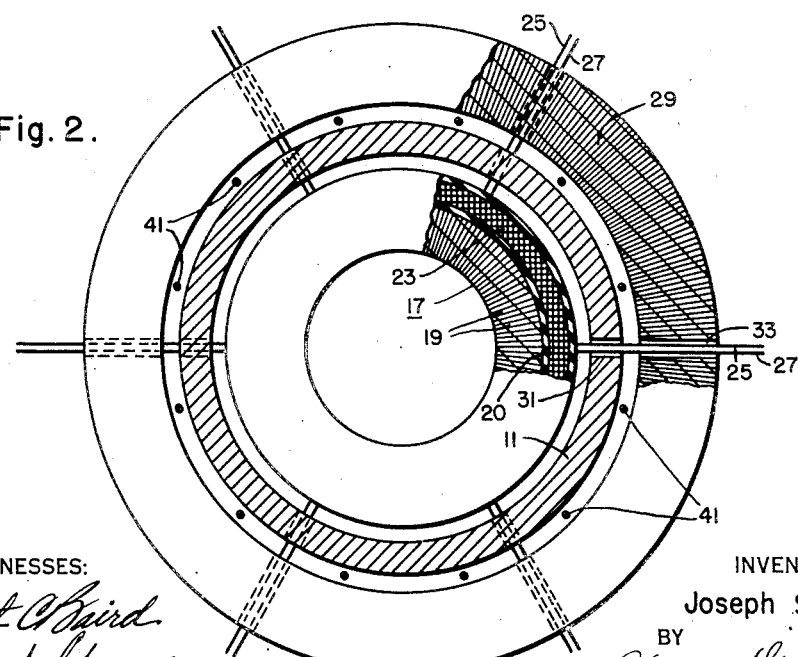
Fig. 2 is a view partly in top elevation, partly in section along the line II—II and partly diagrammatic of the converter shown in Fig. 1.
Figure 4:
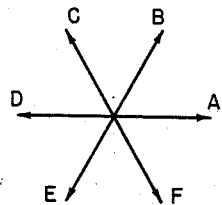
Fig. 4 is a vector diagram showing the relationship between the potentials impressed on the Fig. 1 system.

The apparatus shown in Figs. 1 and 2 includes a hollow cylinder 11 preferably circular and preferably composed of a material of the silicon type. Solid discs 13 and 15 of a highly conductive material such as copper are secured to the upper and lower edges of the cylinder. Within the cylinder, a hollow cylindrical core 17 of magnetizable material is disposed.

Figure 3:
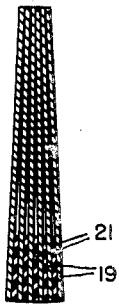
Fig. 3 is a view in section of a portion of a core utilized in the apparatus shown in Fig. 1.

A portion of this core is shown in Fig. 3. It is assembled of rectangular strips 19 of substantially equal thickness. The strips 19 are composed of magnetizable material such as iron, for example. Slots 20 extend inwardly from one edge along the length of each strip. These slots are uniformly spaced. Along the slotted edge of each of the strips 19 a spacer 21 of an insulating material such as paper is secured. The insulator 21 extends along the length of the strip 19. An assembly of a plurality of such strip and spacer units has a wedge shaped section and such wedges are combined into a hollow cylindrical assembly with circumferential grooves uniformly spaced along its length. This assembly may be impregnated with a phenolic condensation product or other bond and suitably baked so that it constitutes a rigid hollow cylinder.

Within each of the slots 20 of the core 19, a coil 23 is mounted. This coil may be made up of a plurality of insulated conductors; it may also consist of a single turn of highly conductive material. Each of the coils 23 on the core 17 is provided with a pair of terminal conductors 25 and 27. The coils 23 are so arranged in the core 17 that the successive conductors extend from the coil at angles displaced by approximately 60°. The terminal conductors for every seventh coil, therefore, define a straight line along the length of the core 17.

A second core 29 of magnetizable material constructed similarly to the inner core 17 extends about the cylinder 11 of the silicon type.

The terminal conductors 25 and 27 extend through openings 31 and 33 in the cylinder of the silicon type and in the outer core 29, respectively, and are connected to supply buses 35, 37 and 39 of a polyphase supply. While the supply may be of any phase number, a three-phase supply is utilized with the apparatus shown in Fig. 1. The terminal conductors 25 and 27 are so connected to the supply that the potentials impressed on successive coils 23 are displaced by 60°, the displacement being in the same sense from coil to coil taken in either direction along the core 17.

The relationship of the potentials is illustrated vectorially in Fig. 3. Let us assume for example that the vector A represents the potential of the highest coil 23 on the cylinder 17 and that there is a phase lag of 60° from coil to coil downward along the cylinder. The vectors B, C, D, E, F and A, respectively, there represent the potentials impressed on the second, eighth, fourteenth, etc.; the third, ninth, fifteenth, etc.; the fourth, tenth, sixteenth, etc.; the fifth, eleventh, seventeenth, etc.; the sixth, twelfth, eighteenth, etc.; and the seventh, thirteenth; nineteenth, etc.

When current is conducted through a coil 23, a magnetic field is produced around the coil. This field is dependent at any instant on the instaneous magnitude of the current. Its direction for any coil is substantially radial with respect to the cylinder 11 of the silicon type. As the instantaneous magnitude of the current in the coil 23 varies, the instantaneous magnitude of the field varies. Since the current in the successive coils are displaced in phase, current of a magnitude flowing through one coil is equal to the current which was flowing through the coil above or below it at an instant earlier. The field therefore moves in axial direction along the cylinder 11 of the silicon type.

Figure 5:
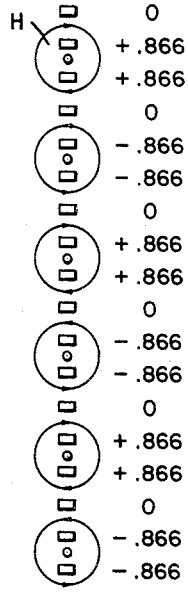
Fig. 5 is a diagram showing the magnetic field lines in a system such as is shown in Fig. 1 at one instant.
Figure 6:
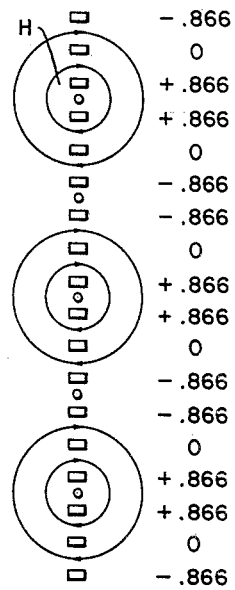
Fig. 6 is a diagram showing these field lines at a later instance.

This movement is illustrated diagrammatically in Figs. 5 and 6. In these views the coils are represented by small squares. The situation in Fig. 5 represents the condition at one instant, that in Fig. 6 at an instant one-sixth of a period later.

At the first instant the current in the upper coil represented in Fig. 5 is assumed to be zero, that in the next coil has a magnitude proportional to the sine of 60° or .866, that in the third has a magnitude proportional to the sine of 120° or .866, the current through the fourth coil is zero, and the current through the two succeeding coils is —.866. The magnitudes are then repeated for the coils which follow. The corresponding magnetic fields are represented by closed loops H having a substantially radial direction in the air gap between the inner and outer cores 17 and 29 where the cylinder 11 of the silicon type is disposed. In this air gap the magnitude of the field is displaced in phase by 90° with reference to the currents in the corresponding coils.

In the situation illustrated in Fig. 6 the current in the first coil has a magnitude proportional to —.866, that in the second coil is zero, that in the third and fourth coils is proportional to .866, and that in the fifth coil is zero. These same magnitudes reoccur for successive coils along the cylinders. The magnetic field is again represented by closed loops H with the air-gap flux displaced downward by one coil. In the iron cores 17 and 29, the flux lines rearrange themselves in closed loops as manifested by the difference between the loops of Fig. 5 and Fig. 6 to conform to the air-gap flux. The magnetic field thus continues to move downward along the cylinder 11 of the silicon type as current is supplied to the coils.

A circumferential electric field is then induced into the conductor 11 by this moving magnetic field. This electric field will produce a circumferential current perpendicular to the magnetic field. As a result of the interaction of the circumferential current and magnetic fields, an axial electric field is produced along the conductor 11 in a sense depending on the algebraic sign of the Hall effect constant for the conductor. The total electric potential developed is then equal to the integral of the electric fields developed along the conductor as the magnetic field moves downward along it. The net effect is similar to that which would be produced for a plurality of aligned short cylinders having the diameter of the cylinder 11. Since the circumferential current and magnetic fields reverse simultaneously, the integrated electric potential is unidirectional. This electric potential is impressed upon a load and supplies current collected by the conducting discs 13 and 15, secured to the ends of the conductor 11. This current is derived at one terminal from one of the discs 15 and at the other terminal from a conducting sheath consisting of a plurality of wires 41 of high conductivity secured to the other disc 3 at points uniformly spaced along its circumference. The wires extend between the outer core 29 and the conductor 11 of the silicon type. At their lower terminal the wires are insulated from the conducting discs 15 and the conductor 11. The current flows in one direction in the conductor 11 and in the opposite direction through the wires 41. Any tendency of the current flow in the silicon conductor 11 to produce a magnetizing effect on the core is thus neutralized by the wire sheath.

Figure 7:
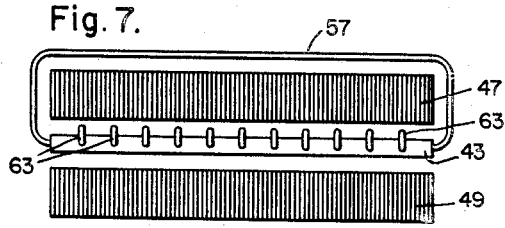
Fig. 7 is a top plan view of a modification of my invention.
Figure 8:
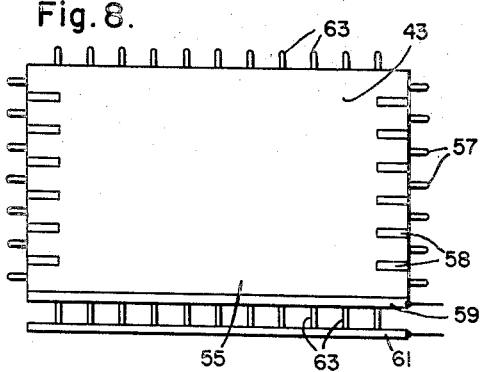
Fig. 8 is a view in side elevation with one part removed of the modification shown in Fig. 7.
Figure 9:
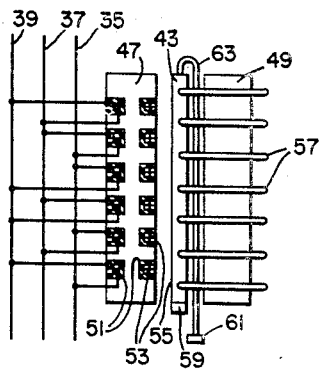
Fig. 9 is a view partly in section and partly diagrammatic of the modification shown in Fig. 7.

The apparatus shown in Figs. 7 to 9 includes a rectangular plate 43 of the silicon type which is disposed between a pair of rectangular cores 47 and 49 of magnetizable material. One of these cores 47 is provided with slots 51 which extend parallel to one dimension of the core and are uniformly spaced along the core in the perpendicular dimension. In these slots, coils 53 are embedded. These coils are supplied from the buses 35, 37 and 39 of a three-phase supply in the same manner as the coils 23 of the structure shown in Figs. 1 and 2. A magnetic field perpendicular to these faces 55 of the plate 43 which are parallel to the slots is thus produced. This field moves along the plate in a direction perpendicular to its lines of force.

An electric field parallel to the slots 51 and perpendicular to the magnetic field is induced in the plate 43 by varying the magnetic field. This electric field produces a current, the circuit for which is completed through a plurality of loops 57 of a highly conductive material. Each loop is a rectangular C shape. The opposite edges of each C are conductively secured to the opposite edges of the plate 43 which are perpendicular to the slots 51 and are uniformly spaced along these edges. The loops are held in planes parallel to the planes of the coils and encircle the core 49. The short-circuiting effect of these loops 57 is minimized by slots 58 projecting inwardly from the edges of the plate 43 to which the loops are secured.

By reason of the interaction of the normal current and the magnetic fields, an electric field is produced along the plate 43 in a direction perpendicular to the current and the magnetic fields. This electric field is integrated into a total electric potential which supplies load current derived at one terminal from a highly conductive bar 59 secured conductively to the lower edge of the plate 43. At the other terminal, it is derived from a conductor 61 connected to a plurality of wires 63 of highly conductive material which are secured conductively to the upper edge of the plate 43 and extend between the core 49 and the plate. These wires constitute a sheath through which the current is conducted in a direction opposite to the current flow through the plate 43. This sheath functions to suppress the magnetizing effect of the current flow through the plate 43.

While I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In combination a conductor, a magnet for producing a magnetic field having a predetermined direction and sense in said conductor, connections for electromagnetically inducing an electric field having a component substantially at right angles to said magnetic field in said conductor and connections for deriving the current which flows at right angles to said electric field component and said magnetic field through said conductor.

2. In combination a conductor, a magnet for producing a magnetic field having a predetermined direction and sense in said conductor, connections for electrically inducing an electric field having a component substantially at right angles to said magnetic field in said conductor and connections for deriving the current which flows at right angles to said electric field component and said magnetic field through said conductor, said last-named connections including a conductor disposed adjacent said magnet to neutralize the magnetic effect of said current on said magnet.

3. In combination a conductor; an electromagnet for producing a magnetic field which moves in a predetermined direction along said conductor, said field having a direction substantially at right angles to said predetermined direction and said electromagnet including exciting conductors, disposed adjacent to said first-named conductor so as to produce therein by induction an electric field having a component substantially at right angles to said magnetic field and said predetermined direction; and connections for deriving the resulting current which flows in said predetermined direction along said first-named conductor.

4. In combination a conductor; an electromagnet for producing a magnetic field which moves in a predetermined direction along said conductor, said field having a direction substantially at right angles to said predetermined direction and said electromagnet including exciting conductors, disposed adjacent to said first-named conductor to produce therein an electric field having a component substantially at right angles to said magnetic field and said predetermined direction; and a core, said first-named conductor being disposed between a portion of said core and said exciting conductors, and connections for deriving the resulting current which flows in said predetermined direction along said first-named conductor, said connections including an additional conductor disposed between said portion of said core and said first-named conductor for neutralizing the magnetizing effect of said current on said core.

5. In combination a first conductor; an electromagnet comprising a core and an exciting conductor, said first conductor being disposed between a portion of said core and said exciting conductors and being adjacent to, but electrically insulated from, said exciting conductor; connections for supplying current to said exciting conductor; and connections for deriving the current which flows through said first conductor by reason of the interaction of the electric and magnetic fields produced by said exciting conductor and said core, said connections including a third conductor connected to said first conductor and interposed between said portion of said core and said first conductor in such manner as to conduct current in a direction opposite to the direction in which it is being conducted through said first conductor.

6. In combination a conductive cylindrical shell; a cylindrical core of magnetizable material disposed within said shell, said core having a plurality of circumferential grooves disposed along its surface; a conductive loop in each said groove; terminals for deriving power from an $n$ phase supply; connections between each said loop and a pair of said terminals such that the potential from said supply when it is impressed on the loop in any groove will be displaced in phase by $$\frac{360}{n}$$

degrees with respect to the potential of a succeeding groove, said displacement being of the same polarity for successive loops along said core and a hollow cylindrical core of magnetizable material enclosing said shell.

7. In combination a conductive cylindrical shell; a cylindrical core of magnetizable material disposed within said shell, said core having a plurality of circumferential grooves disposed along its surface; a conductive loop in each said groove; terminals for deriving power from an $n$ phase supply; connections between each said loop and a pair of said terminals such that the potential from said supply when it is impressed on the loop in any groove will be with respect to the potential of a succeeding groove, said displacement being of the same polarity for successive loops along said core; a hollow cylindrical core of magnetizable material enclosing said shell, and connections for deriving current from said shell, said connections including a conductor connected at one terminal only to said shell and extending between said shell and said hollow core.

8. In combination a conductive cylindrical shell; a cylindrical core of magnetizable material disposed within said shell, said core having a plurality of circumferential grooves disposed along its surface; a conductive loop in each said groove; terminals for deriving power from an $n$ phase supply; connections between each said loop and a pair of said terminals such that the potential from said supply when it is impressed on the loop in any groove will be displaced in phase by $$\frac{360}{n}$$

degrees with respect to the potential of a succeeding groove, said phase displacement being of the same polarity for successive loops along said core; a hollow cylindrical core of magnetizable material enclosing said shell, and connections for deriving current from said shell, said connections including a conductive sheath connected at one terminal only to said shell and extending between said shell and said hollow core.

9. In combination a conductive plate; a pair of conductive cores of magnetizable material having substantially the same geometric form as said plate and at least the same area, said plate being disposed between said cores; a plurality of individual exciting windings each extending circumferentially around one of said cores, said windings being spaced along one dimension of said core; and connections for supplying current to said windings.

10. In combination a conductive plate; a pair of conductive cores of magnetizable material having substantially the same geometric form as said plate and at least the same area, said plate being disposed between said cores; a plurality of individual exciting windings each extending circumferentially around one of said cores, said windings being spaced along one dimension of said core; connections for supplying current to said windings; and a plurality of individual conductive loops extending between opposite edges, said loops lying in planes substantially parallel to the planes of said windings.

11. In combination a conductive plate; a pair of conductive cores of magnetizable material having substantially the same geometric form as said plate and at least the same area, said plate being disposed between said cores; a plurality of individual exciting windings each extending circumferentially around one of said cores, said windings being spaced along one dimension of said core; connections for supplying current to said windings; and a plurality of individual conductive loops extending between opposite edges, said loops lying in planes substantially parallel to the planes of said windings, said loops having a substantially higher conductivity than said plate and said plate having slots between the regions where said loops are received thereto.

12. In combination a conductive plate; a pair of conductive cores of magnetizable material having substantially the same geometric form as said plate and at least the same area, said plate being disposed between said cores; a plurality of individual exciting windings each extending circumferentially around one of said cores, said windings being spaced along one dimension of said core; connections for supplying current to said windings; a plurality of individual conductive loops extending between opposite edges, said loops lying in planes substantially parallel to the planes of said windings; and connections for deriving the current which flows through said plate substantially at right angles to the magnetic and electric field produced and induced respectively by current flow through said windings, said connections including a conductor extending between one of said cores and said plate.

13. A Hall-effect converter including a conductor in which an electric current is produced in the conductor when an electric field and a magnetic field having components at right angles are impressed thereon, characterized by inductive means for producing said electric field.

14. A Hall-effect converter including a conductor in which a potential is produced in the conductor when an electric field and a magnetic field having right angle components are impressed thereon, characterized by another conductor disposed adjacent to said first named conductor and adapted to have electric current conducted therethrough to produce said electric field and said magnetic field.

15. In combination a first conductor; an electromagnet comprising a core and an exciting conductor, said first conductor being disposed between a portion of said core and said exciting conductors and being adjacent to, but electrically insulated from, said exciting conductor so that said exciting conductor induces an electric field in said first conductor; connections for supplying current to said exciting conductor; and connections for deriving the current which flows through said first conductor by reason of the interaction of the electric and magnetic fields produced by said exciting conductor and said core.

16. A Hall-effect converter including a conductor in which a load current flows in the conductor when an electric field and a magnetic field having components at right angles are impressed thereon, characterized by means for neutralizing the magnetic effects of said load current as it flows in said conductor.

17. In combination a first conductor; said conductor being of the silicon type, an electromagnet comprising a core and an exciting conductor, said first conductor being disposed between a portion of said core and said exciting conductor and being adjacent to, but electrically insulated from, said exciting conductor so that said exciting conductor when excited induces an electric field in said first conductor; connections for supplying current to said exciting conductor; and connections for deriving the current which flows through said first conductor by reason of the interaction of the electric and magnetic fields produced by said exciting conductor and said core.

18. A Hall-effect converter including a conductor in which a load current flows in the conductor when an electric field and a magnetic field having components at right angles are impressed thereon, characterized by a second conductor for deriving said load current from said first-named conductor disposed to neutralize the magnetic effects of said load current as it flows in said first conductor.

JOSEPH SLEPIAN.

REFERENCES CITED

The following references are of record in the file of this patent:

UNITED STATES PATENTS

| Number | Name | Date |
| --- | --- | --- |
| 1,892,826 | Bettison et al. | Jan. 3, 1933 |
| 2,008,857 | Flanders | July 23, 1935 |
| 2,373,601 | Robinson | Apr. 10, 1945 |
| 2,464,807 | Hansen | Mar. 22, 1949 |
| 2,594,939 | Leete | Apr. 29, 1952 |